Aug. 2, 1938. W. WOODWARD 2,125,746
AUTOMATIC FENDER LIGHT
Filed Dec. 3, 1936
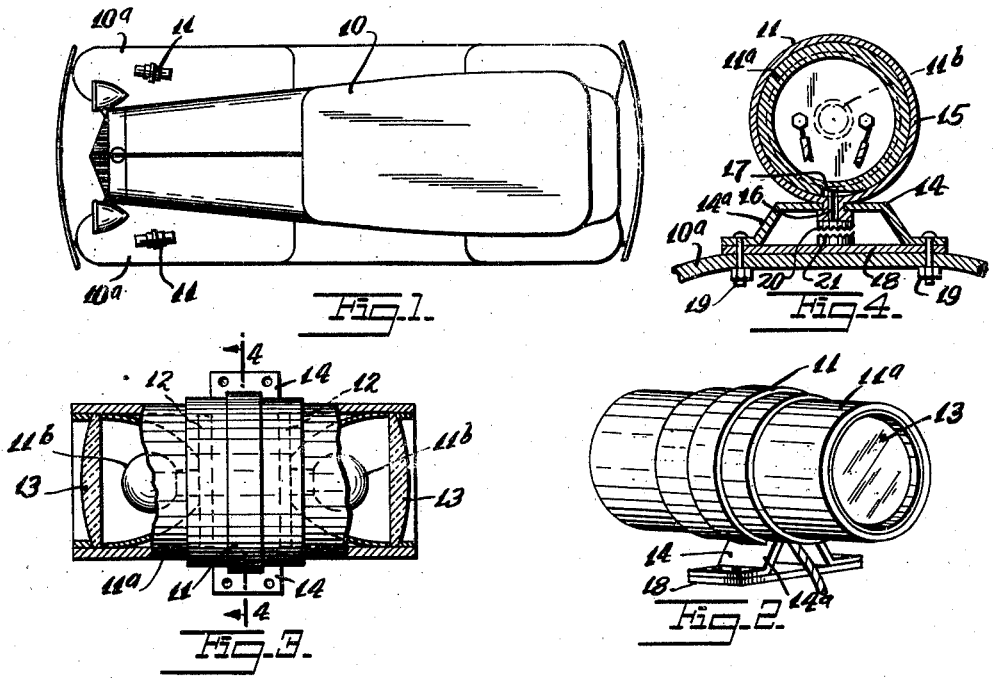
INVENTOR
Willoughby Woodward
BY
ATTORNEY Patented Aug. 2, 1938

2,125,746

UNITED STATES PATENT OFFICE 2,125,746

AUTOMATIC FENDER LIGHT

Willoughby Woodward, New York, N. Y.

Application December 3, 1936, Serial No. 113,948

2 Claims. (Cl. 248—289)

This invention relates to new and useful improvements in an automatic fender light.

The invention has for an object the construction of a light for the fender of a vehicle which is capable of being seen from the front as well as from the rear, and which is associated with an automatic switch for lighting the light when the vehicle is being steered. The invention contemplates an arrangement whereby the light on the right fender will illuminate when the vehicle is turned to the right, and the light on the left fender when turned to the left.

The invention also proposes a foot switch arranged in the circuit of the lights and adapted to manually control the operation so that the signal may be given before an actual turn is made.

It is also proposed to arrange the foot switch in a manner so that both lights may be lit simultaneously to indicate a stop.

Still further the invention proposes to arrange each fender lamp with a tubular body arranged slightly obliquely on the fender to increase the range of vision from the rear.

Still further the invention proposes an arrangement by which the oblique position of the lamp may be controlled and varied as desired.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a plan view of an automobile equipped with a pair of front fender lamps constructed according to this invention.

Fig. 2 is a perspective view of one of the lamps per se.

Fig. 3 is a plan view of the lamp shown in Fig. 2 with end portions thereof broken away to disclose interior parts.

Fig. 4 is an enlarged transverse sectional view taken on the line 4—4 of Fig. 3 but illustrating the lamp mounted upon a fender.

In Fig. 1 an automobile 10 has been illustrated having front fenders 10$^a$. Obliquely mounted on each fender, when viewed from the top, there is a lamp 11. Each of these lamps comprises a tubular body 11$^a$ in the ends of which electric lights 11$^b$ are mounted. These electric lights are supported on transverse discs 12 mounted within the tubular body. A lens or other glass 13 is secured across the ends of the body to cover the lamps. Preferably, the glass at the rear end of the fender lamp should be tinted red.

A bracket 14 is provided for attachment on the fender 10$^a$ of a vehicle and serves to support the lamp. A band 15 is rotatively mounted at one side on each bracket 14. A means is provided for holding said band in fixed rotative positions operable upon the depression of a stem 16. The tubular body 11$^a$ is rotative in the band and has a cam element 17 engaging said depressible stem for controlling the same.

The bracket 14 has a raised central portion 14$^a$. It is mounted upon a base plate 18. Bolts or screws 19 engage through the ends of the bracket 14, the base plate 18 and through the fender 10$^a$ for securing the parts fixedly thereon. A clutch jaw 20 is mounted on the outer end of the stem 16 and is cooperative with a stationary clutch jaw 21 mounted upon the base plate 18. These clutch jaws are disposed within the space formed by the raised central portion 14$^a$ of the bracket. The stem 16 is square or of a different shape in transverse cross section arranged so as to be non-rotative. The cam element 17 is in the form of a slot which is very deep at one end and shallow at the other end. The ends of this slot serve to limit the possible turning of the tubular body 11$^a$.

Each lamp 11 may be angularly adjusted by rotating the body 11$^a$ so as to release the stem 16. Then the jaws 20 and 21 are loose and the lamp may be swivelled upon the bracket 14 to any desired position. The body 11$^a$ may then be turned in the opposite direction so that the cam 17 forces the stem 16 downwards to engage the jaws 20 and 21. The lamp is now held in the fixed position, fixed against any further swivelling.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. In a device of the class described, a bracket for attachment on the fender of a vehicle, a band rotatively mounted on one side of said bracket, means for holding said band in fixed rotative positions comprising a depressible stem, and a tubular body rotative in said band and having a cam element engaging said depressible stem for controlling same, said cam element comprising a cam groove being deep at one end and shallow at the other end, and the ends of said groove serving as a limiting means for limiting turning of said tubular body, said depressible stem being slidably and non-rotatively connected with said band, the outer end of the stem being provided with a clutch jaw engageable in the extended position of the stem with a coacting clutch jaw mounted on said bracket.

2. In a device of the class described, a bracket for attachment on the fender of a vehicle, a band rotatively mounted on one side of said bracket, means for holding said band in fixed rotative positions comprising a depressible stem, and a tubular body rotative in said band and having a cam element engaging said depressible stem for controlling same, said cam element comprising a cam groove being deep at one end and shallow at the other end, and the ends of said groove serving as a limiting means for limiting turning of said tubular body, said depressible stem being slidably and non-rotatively connected with said band, the outer end of the stem being provided with a clutch jaw engageable in the extended position of the stem with a coacting clutch jaw mounted on said bracket, said clutch jaws being disposed within a hollow formed by a raised portion of said bracket.

WILLOUGHBY WOODWARD.